(12) United States Patent
Das et al.

(10) Patent No.: US 12,524,704 B2
(45) Date of Patent: Jan. 13, 2026

(54) LEARNING BASED MODELING OF EMERGENT BEHAVIOUR OF COMPLEX SYSTEM

(71) Applicant: Tata Consultancy Services Limited, Mumbai (IN)

(72) Inventors: Prasenjit Das, Kolkata (IN); Souvik Barat, Pune (IN); Vinay Kulkarni, Pune (IN); Prashant Kulmar, Pune (IN); Kaustav Bhattacharya, Chennai (IN); Sankaranarayanan Viswanathan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 1123 days.

(21) Appl. No.: 17/477,713

(22) Filed: Sep. 17, 2021

(65) Prior Publication Data

US 2022/0318676 A1 Oct. 6, 2022

(30) Foreign Application Priority Data

Feb. 26, 2021 (IN) .............................. 202121008298

(51) Int. Cl.
*G06N 20/00* (2019.01)
(52) U.S. Cl.
CPC ................................... *G06N 20/00* (2019.01)
(58) Field of Classification Search
CPC ..................................................... G06N 20/00
See application file for complete search history.

(56) References Cited

U.S. PATENT DOCUMENTS

| | | | |
|---|---|---|---|
| 9,792,397 B1* | 10/2017 | Nagaraja | G06F 30/32 |
| 10,282,512 B2* | 5/2019 | Bennett | G16H 50/20 |

(Continued)

FOREIGN PATENT DOCUMENTS

| | | | | |
|---|---|---|---|---|
| CN | 110488629 A | * | 11/2019 | G05B 17/02 |
| CN | 111241752 A | * | 6/2020 | G06N 20/00 |

(Continued)

OTHER PUBLICATIONS

Souvik Charkraborty, etc., "Machine Learning Based Digital Twin for Dynamical Systems with Multiple Time-Scales", published Jun. 14, 2020 to arXiv, retrieved Oct. 17, 2024. (Year: 2020).*

(Continued)

*Primary Examiner* — Shourjo Dasgupta
(74) *Attorney, Agent, or Firm* — Finnegan, Henderson, Farabow, Garrett & Dunner, LLP

(57) ABSTRACT

The disclosure generally related to a learning-based modelling of an emergent behavior of a complex system. Existing decision-making at complex systems primarily relies on qualitative approaches, which often results in inaccurate outputs. The disclosed system includes a digital twin of the complex system and a digital twin of an environment of said complex system, and captures an interaction and dynamic behavior of agents of the digital twins. The agents of the digital twins are simulated and modelled using learning-based models such as RL and genetic algorithms that learns the behavior (i.e. actions and their outcomes) over a period of time. Hence, the agents (or actors) of the digital twins are dynamic in nature. The actor-based bottom up simulation approach is capable of producing sufficient insight for effective decision making prior to implementation.

3 Claims, 11 Drawing Sheets

(56) References Cited

U.S. PATENT DOCUMENTS

| | | | |
|---|---|---|---|
| 10,592,828 B2* | 3/2020 | Farooq | G06Q 30/0201 |
| 2007/0150330 A1 | 6/2007 | McGoveran | |
| 2018/0240043 A1* | 8/2018 | Majumdar | H04L 41/16 |
| 2019/0122092 A1* | 4/2019 | Haines | G06T 11/001 |
| 2019/0171438 A1* | 6/2019 | Franchitti | G06N 3/08 |
| 2020/0380434 A1* | 12/2020 | Bhattacharya | G06F 16/254 |
| 2021/0357555 A1* | 11/2021 | Liu | G06F 30/20 |

FOREIGN PATENT DOCUMENTS

| | | | | |
|---|---|---|---|---|
| CN | 111797163 A | * | 10/2020 | G06F 16/215 |
| JP | 2019508830 A | * | 3/2019 | G06N 3/042 |
| WO | WO2020/229904 A1 | | 11/2020 | |

OTHER PUBLICATIONS

Qiang Liu, etc., "Digital twin-based designing of the configuration, motion, control, and optimization model of a flow-type smart manufacturing system", published in Journal of Manufacturing Systems, vol. 58, part B, pp. 52-64, Jan. 2021, retrieved Oct. 17, 2024. (Year: 2021).*

James Moyne, etc., "A Requirements Driven Digital Twin Framework: Specification and Opportunities", published in IEEE Access, vol. 8, Jun. 5, 2020, retrieved Oct. 17, 2024. (Year: 2020).*

Christian Stary, etc., "Digital Twin Generation: Re-Conceptualizing Agent Systems for Behavior-Centered Cyber-Physical System Development", published in Sensors 2021, 21, 1096, Feb. 5, 2021, retrieved Oct. 17, 2024. (Year: 2021).*

Leonardo A. Espinosa Leal, etc., "Autonomous Industrial Management via Reinforcement Learning: Self-Learning Agents for Decision-Making—A Review", published on Oct. 20, 2019 to arXiv, retrieved Apr. 23, 2025. (Year: 2019).*

Angira Sharma, etc., "Digital Twins: State of the Art Theory and Practice, Challenges, and Open Research Questions", published on Dec. 4, 2020 to arXiv, retrieved Apr. 23, 2025. (Year: 2020).*

M. Mazhar Rathore, etc., "The Role of AI, Machine Learning, and Big Data in Digital Twinning: A Systematic Literature Review, Challenges, and Opportunities", published Feb. 22, 2021 to IEEE Access, retrieved Apr. 23, 2025. (Year: 2021).*

Constantin Cronrath, etc., "Enhancing Digital Twins through Reinforcement Learning", published to IEEE Xplore on Sep. 19, 2019, retrieved Apr. 23, 2025. (Year: 2019).*

Zai Muller-Zhang, etc., "Dynamic Process Planning using Digital Twins and Reinforcement Learning", published via 2020 25th IEEE International Conference on Emerging Technologies and Factory Automation (ETFA), Sep. 8-11, 2020, Austria Vienna, retrieved Apr. 23, 2025. (Year: 2020).*

Florian Jaensch, etc., "Digital Twins of Manufacturing Systems as a Base for Machine Learning", published via 2018 25th International Conference on Mechatronics and Machine Vision in Practice (M2VIP), Nov. 20-22, 2018, Stuttgart, Germany, retrieved Apr. 23, 2025. (Year: 2018).*

Florian Jaensch, etc., "Reinforcement Learning of Material Flow Control Logic using Hardware-in-the-Loop Simulation", published via 2018 First International Conference on Artificial Intelligence for Industries (AI4I), Sep. 26-28, 2018, Laguna Hills, CA, USA, retrieved Apr. 23, 2025. (Year: 2018).*

Zijie Ren, etc., "Strengthening Digital Twin Applications based on Machine Learning for Complex Equipment", published via 2021 Design, Automation & Test in Europe Conference & Exhibition (Date), Feb. 1-5, 2021, retrieved Apr. 23, 2025. (Year: 2021).*

Raju Kandaswamy, "Digital Twins and Reinforcement Learning using Unity ML-Agents", published to YouTube on Oct. 1, 2020 at https://www.youtube.com/watch?v=Kr3dx8QD8a4, retrieved Apr. 23, 2025. (Year: 2020).*

Igor Kiselev, etc., "An Adaptive Multi-agent System for Continuous Learning of Streaming Data", published via 2008 IEEE/WIC/ACM International Conference on Web Intelligence and Intelligent Agent Technology (vol. 2, 2008, pp. 148-153), retrieved Jul. 14, 2025. (Year: 2008).*

Bruno Maione, etc., "Evolutionary Learning Agents for Shop Floor Control", published via 1999 7th IEEE International Conference on Emerging Technologies and Factory Automation. Proceedings ETFA '99 (Cat. No. 99TH8467), retrieved Jul. 14, 2025. (Year: 1999).*

Zhenglei He, etc., "A Deep Reinforcement Learning Based Multi-Criteria Decision Support System for Textile Manufacturing Process Optimization", published to arXiv as of Dec. 29, 2020, retrieved Jul. 14, 2025. (Year: 2020).*

Sindhu Padakandla, etc., A Survey of Reinforcement Learning Algorithms for Dynamically Varying Environments, published to arXiv as of May 19, 2020, retrieved Jul. 14, 2025. (Year: 2020).*

Mathworks, "Train Reinforcement Learning Agents—Matlab & Simulink", published on Apr. 1, 2019 to https://www.mathworks.com/help/reinforcement-learning/ug/train-reinforcement-learning-agents.html, retrieved Aug. 13, 2025. (Year: 2019).*

Souvik Barat, "An actor based simulation driven digital twin for analyzing complex business systems," Winter Simulation Conference (WSC), Dec. 2019, IEEE, https://eprints.mdx.ac.uk/27284/1/Con228%20-%20WinterSim-corrected%5B1%5D.pdf.

* cited by examiner

FIG. 4 ← 400

LEARNING BASED MODELING OF EMERGENT BEHAVIOUR OF COMPLEX SYSTEM

PRIORITY CLAIM

This U.S. patent application claims priority under 35 U.S.C. § 119 to: India Application No. 202121008298, filed on Feb. 26, 2021. The entire contents of the aforementioned application are incorporated herein by reference.

TECHNICAL FIELD

The disclosure herein generally relates to complex systems, and, more particularly, to learning based modeling of emergent behavior of complex systems.

BACKGROUND

Complex systems, for instance, modern enterprises are systems with people process and IT infrastructure. Each system has independent existence and goals. They operate in a dynamic uncertain environment and continuously evaluate their status-quo and evolve to stay competitive and economically viable in the current business environment. In this endeavor, decision-makers constantly explore the answers for a range of decision questions such as: Is the current form of the organization appropriate to stay ahead of competition or economically viable? What kind of changes are necessary to achieve organizational goals? Where to apply those change? When to apply those changes?

Addressing these decision questions requires understanding of multiple aspects of the enterprise and its operating environment. This is extremely difficult due of the characteristics of the enterprise that includes socio-technical aspects, organizational structure, inherent uncertainty, and emergent behavior, among others.

Existing decision-making at complex systems primarily relies on qualitative approaches, such as discussion and interviews, with limited quantitative assistance that comes from spreadsheets-based data computation. There exists excessive dependency on human intuitions and interpretations. These often results in a less effective decision. This is especially true when the context is complex, dynamic, and uncertain.

There exists multiple enterprise modelling and analysis techniques supporting quantitative approaches for organizational decision making. However, their utility is limited to a class of decision-making problems compared to a wide range of problems. For example, inferential techniques that rely on the statistical interpretation of historical system data are suitable only for static environments. The mathematical models, such as linear programming, work well for mechanistic and monolithic systems that are not adaptive in nature. The enterprise models, such as ArchiMate, i*, and BPMN, are found to be inappropriate for the systems that exhibit significant uncertainty and emergent behavior. The actor technologies and agent-based systems fall short of expressing the complex organizational structure and uncertainty. The decision-making challenges may be dealt with in the enterprise utilizing modelling and analysis techniques.

SUMMARY

Embodiments of the present disclosure present technological improvements as solutions to one or more of the above-mentioned technical problems recognized by the inventors in conventional systems. For example, in one embodiment, a method for learning based modelling of complex system is provided. The method includes simulating, via one or more hardware processors, a first digital twin of a complex system and a second digital twin of an environment associated with the complex system, the first digital twin comprising a first set of digitally configured dynamic agents and the second digital twin comprising a second set of digitally configured dynamic agents, each of the first set and the second set of digitally configured dynamic agents defined using one or more state variables, one or more characteristic variables and a set of actions. Further the method includes receiving via the one or more hardware processors, a trigger at one or more digitally configured dynamic agents from amongst the first set and the second set of digitally configured dynamic agents. Furthermore, the method includes computing, via the one or more hardware processors, a current value of the one or more state variables and the one or more characteristic variables associated with the one or more digitally configured dynamic agents by accessing a system database. Moreover, the method includes, predicting, via the one or more hardware processors, a difference between the current value and an expected value of the one or more state variables and the one or more characteristics variables, the current value computed using multi criteria decision making technique, the expected value obtained from one or more goals associated with the complex system, the one or more goals prestored in a knowledge repository associated with the complex system, and wherein the one or more goals are indicative of decision-making in response to the trigger in the complex system. Also, the method include defining, based on the difference between the current value and the expected value of the one or more state variables and the one or more characteristic variables, a decision function for the one or more digitally configured dynamic agents using a decision function, via the one or more hardware processors, wherein the decision function is realized using at least one of a Reinforcement learning (RL) and optimization technique, and wherein the observation is indicative of outcome of the decision function and ability to reach to the desired state in the future time. The first and second set of digitally configured dynamic agents are simulated iteratively via the one or more hardware processors, based on the decision function in a plurality of iterations until the difference between the current value and expected value of the one or more state variables is determined to be within a predetermined threshold limit.

In another aspect, a system for learning based modelling of complex system is provided. The system includes a memory storing instructions; one or more communication interfaces; and one or more hardware processors coupled to the memory via the one or more communication interfaces, wherein the one or more hardware processors are configured by the instructions to simulate a first digital twin of a complex system and a second digital twin of an environment associated with the complex system, the first digital twin comprising a first set of digitally configured dynamic agents and the second digital twin comprising a second set of digitally configured dynamic agents, each of the first set and the second set of digitally configured dynamic agents defined using one or more state variables, one or more characteristic variables and a set of actions. Further, the one or more hardware processors are configured by the instructions to receive a trigger at one or more digitally configured dynamic agents from amongst the first set and the second set of digitally configured dynamic agents. Furthermore, the compute a current value of the one or more state variables and the one or more characteristic variables associated with the one or more digitally configured dynamic agents by accessing a system database. Also, the one or more hardware processors are configured by the instructions to predict a difference between the current value and an expected value of the one or more state variables and the one or more characteristics variables, the current value computed using multi criteria decision making technique, the expected value obtained from one or more goals associated with the complex system, the one or more goals prestored in a knowledge repository associated with the complex system, and wherein the one or more goals are indicative of decision-making in response to the trigger in the complex system. Moreover, the one or more hardware processors are configured by the instructions to define, based on the difference between the current value and the expected value of the one or more state variables and the one or more characteristic variables, a decision function for the one or more digitally configured dynamic agents using a decision function, wherein the decision function is realized using at least one of a Reinforcement learning (RL) and optimization technique, and wherein the observation is indicative of outcome of the decision function and ability to reach to the desired state in the future time. The one or more hardware processors are further configured by the instructions to simulate iteratively the first and second set of digitally configured dynamic agents based on the decision function in a plurality of iterations until the difference between the current value and expected value of the one or more state variables is determined to be within a predetermined threshold limit.

In yet another aspect, a non-transitory computer readable medium for a method for learning based modelling of complex system is provided. The method includes simulating, via one or more hardware processors, a first digital twin of a complex system and a second digital twin of an environment associated with the complex system, the first digital twin comprising a first set of digitally configured dynamic agents and the second digital twin comprising a second set of digitally configured dynamic agents, each of the first set and the second set of digitally configured dynamic agents defined using one or more state variables, one or more characteristic variables and a set of actions. Further the method includes receiving via the one or more hardware processors, a trigger at one or more digitally configured dynamic agents from amongst the first set and the second set of digitally configured dynamic agents. Furthermore, the method includes computing, via the one or more hardware processors, a current value of the one or more state variables and the one or more characteristic variables associated with the one or more digitally configured dynamic agents by accessing a system database. Moreover, the method includes, predicting, via the one or more hardware processors, a difference between the current value and an expected value of the one or more state variables and the one or more characteristics variables, the current value computed using multi criteria decision making technique, the expected value obtained from one or more goals associated with the complex system, the one or more goals prestored in a knowledge repository associated with the complex system, and wherein the one or more goals are indicative of decision-making in response to the trigger in the complex system. Also, the method include defining, based on the difference between the current value and the expected value of the one or more state variables and the one or more characteristic variables, a decision function for the one or more digitally configured dynamic agents using a decision function, via the one or more hardware processors, wherein the decision function is realized using at least one of a Reinforcement learning (RL) and optimization technique, and wherein the observation is indicative of outcome of the decision function and ability to reach to the desired state in the future time. The first and second set of digitally configured dynamic agents are simulated iteratively via the one or more hardware processors, based on the decision function in a plurality of iterations until the difference between the current value and expected value of the one or more state variables is determined to be within a predetermined threshold limit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
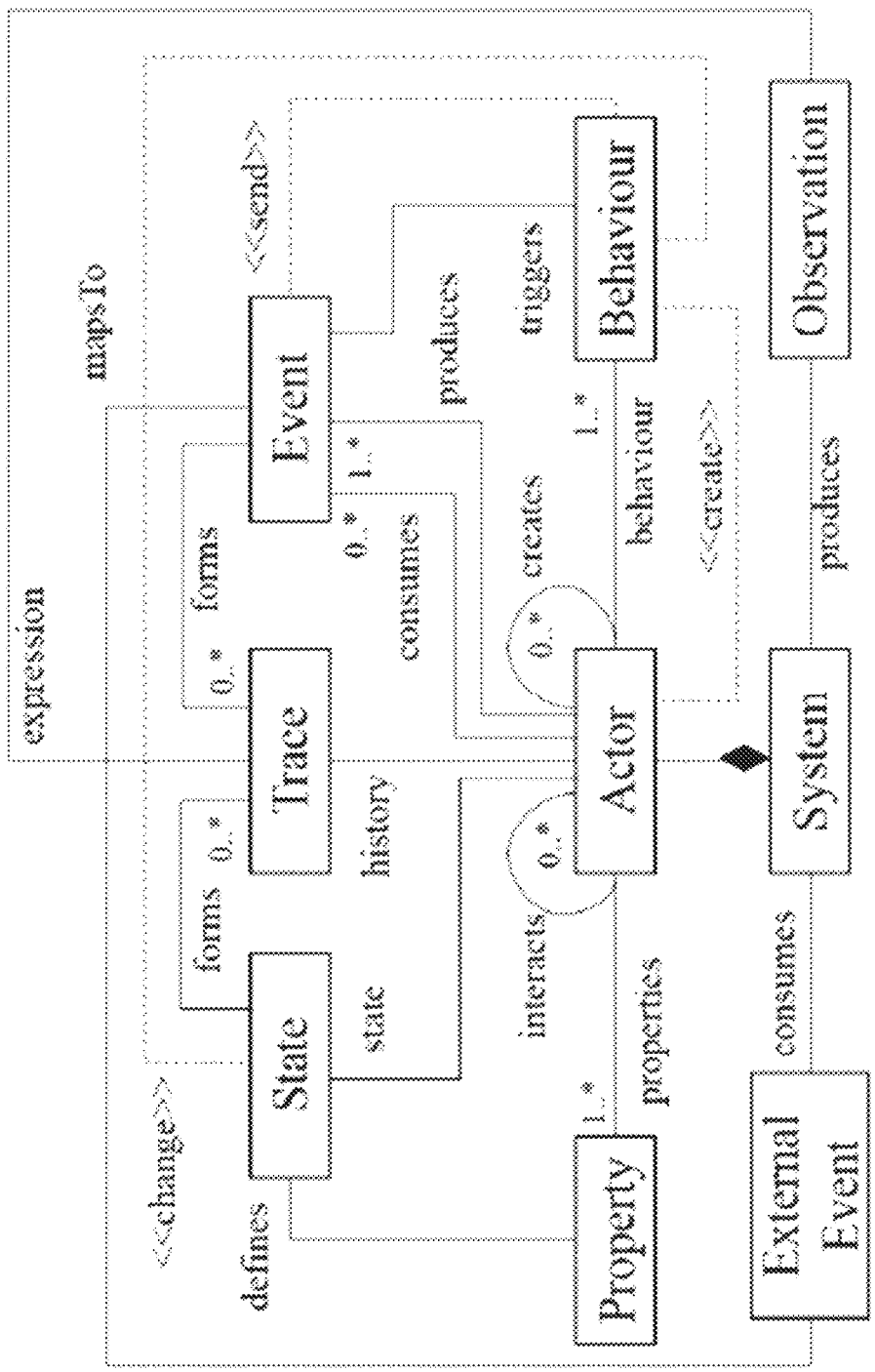
FIG. 1 illustrates typical core concepts of decision-making in a complex system using a meta-model.

Two critical aspects of organizational decision-making includes (1) What and how to capture the necessary information of an organizational decision-making problem, and (2) How to analyze various decision alternatives and understand their consequences prior to their implementation.

Organizational theory and management studies on decision-making help in identifying the necessary information of an organizational decision-making (i.e. what to capture). Once the necessary information becomes available, systematically capturing and utilizing this information to analyze multiple decision choices and understanding their consequences prior to their implementation is vitally important. Effective decision-making based on precise understanding of an organization is critical for modern organizations to stay competitive in a dynamic and uncertain business environment.

Management theories describe decision-making using three broad concepts, namely: decision problem, course of action and decision. The decision problem is organizational goals that an organization targets, courses of action is the knowledge of alternatives that are considered and evaluated in a decision-making action, and a decision is the outcome of a decision-making action, i.e., selected alternative. However, the state-of-the-art technologies that are relevant in this context are not adequate to capture and quantitatively analyze complex organizations.

It requires specific contextual information to evaluate the consequences of potential courses of action, i.e., develop knowledge of consequences. Methodologically, a decision-making is approached using four steps, namely (1) problem identification, i.e., defining precise decision problem (2) generation of alternative courses of action, i.e., development of knowledge of alternatives for a decision problem, (3) evaluation of courses of action or developing knowledge of consequences by predicting/computing the key performance indicators (KPIs) from contextual information, and (4) ranking of courses of action (i.e., consequent preference ordering) and selection of the most effective course of action (i.e. a decision).

The embodiments disclosed herein provides a system and method to develop the system to enable the decision makers in evaluating different decision alternatives on a digital representation of the real enterprise and to help them identify the optimal choices to be applied on the real enterprise in a reliable and automated manner. For example, the disclosed system is capable of capturing the necessary information of organizational/complex system's decision-making effectively. The system is further capable of analyzing what-if scenarios. In an embodiment, the disclosed system captures the necessary information utilizing the following two concepts: (1) system of systems and (2) an actor model of computation. The aforementioned concepts lead to the creation of a digital replica of the complex system, also known as a digital twin. The digital twin captures the structure as well as the behavior of the complex system. The actor model enables the digital twin to replicate the complex system in a bottom-up fashion. It also allows to perform simulation of different aspects of the complex system on its digital twin. The analysis approach utilizes the bottom-up simulation technique to understand the key characteristics of complex system such as: autonomy, adaptability, uncertainty, and emergent behavior.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 7, where similar reference characters denote corresponding features consistently throughout the figures, there are shown preferred embodiments and these embodiments are described in the context of the following exemplary system and/or method.

FIG. 1 illustrates typical core concepts of organizational decision-making using a meta-model 100. The concept of decision-making are represented using three entities: Goal, Measures, and Lever. The concept Goal represents the organizational goals. Measure represents the key performance indicators (KPIs) that indicate the fulfillment of Goals. A Lever is a conceptual representation of a course of action.

The contextual information for decision-making is represented using two primitive elements: Organization and Environment. An organization is visualized as a system that has Structure, Behavior and State. Moreover, an organization often records its historical states, interactions, realization of goals, and the useful phenomena as an organizational memory. These historical records are termed as Trace. Operationally, Behavior updates the State and Trace of an organization. The concepts of GM-L (Goals, Measure, Lever) structure and contextual information converge at two concepts: Lever and Measure. A Lever of a GM-L structure describes the changes of Organization elements that include Structure, Behavior, and Goal; whereas, the Measures are expression over Trace and State. In this formulation, an organizational decision making is a method to develop the knowledge of consequences by computing/predicting the Measures for all identified Levers (i.e. the knowledge of alternatives), rank the Levers based on the observed Measure values (i.e., consequent preference ordering), and select a Lever that serves the purpose best (i.e., decision).

Typically, a complex system is a reactive entity (as it exchanges messages and resources with its environment). The complex entity often composes a large number of interdependent subsystems or elements (i.e., system of systems) in a nonlinear way. The complex system may be characterized by a composition of multiple loosely coupled and autonomous elements. The behavior of a complex organization is largely probabilistic and emerges from the interactions of the connected sub-systems and individuals. Accordingly, a complex system may be visualized as a system of systems, where each constituent system is characterized by multiple socio-technical properties such as:

modularity, composability, autonomy, temporality, reactiveness, adaptability, uncertainty and emergentism.

The disclosed embodiments present method and system to facilitate modelling and analysis technique for supporting quantitative evidence-driven decision-making in the complex system. For example, the disclosed embodiments present system and method for decision-making process using a digital twin of the complex system and a digital twin of the environment of the complex system. The method and system are described further with reference to FIGS. 2A-7.

Figure 2A:
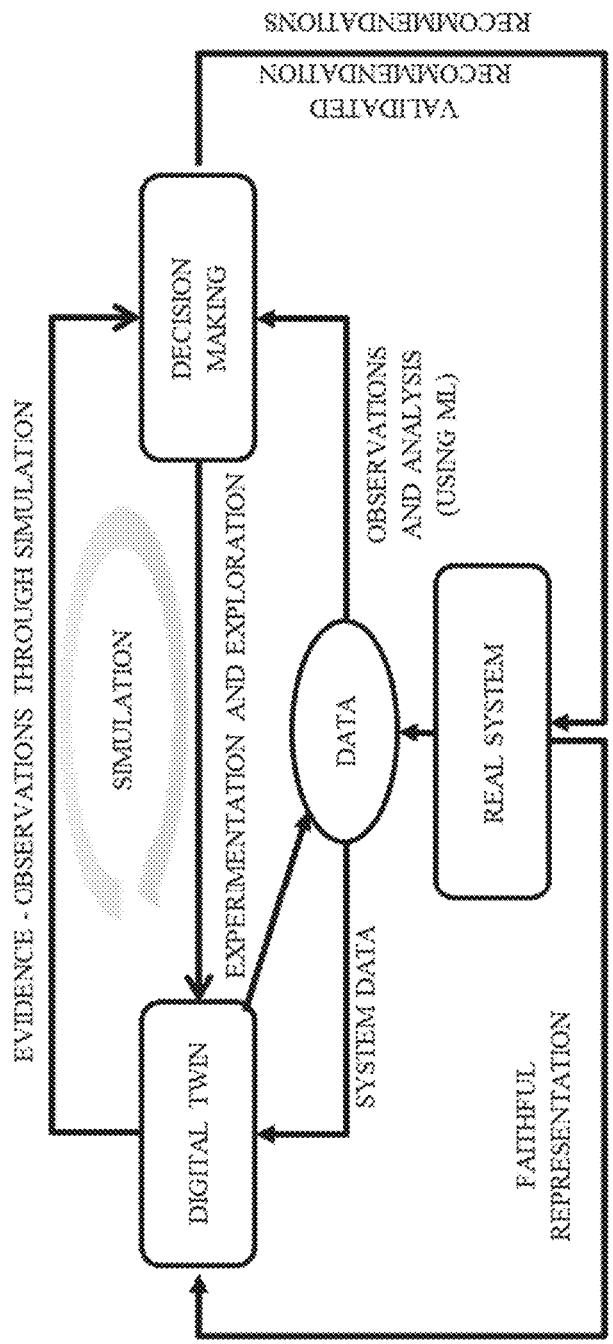
FIG. 2A describes a first block diagram of a method and system for learning based modelling of a complex system in accordance with example embodiments of the present disclosure.
Figure 2B:
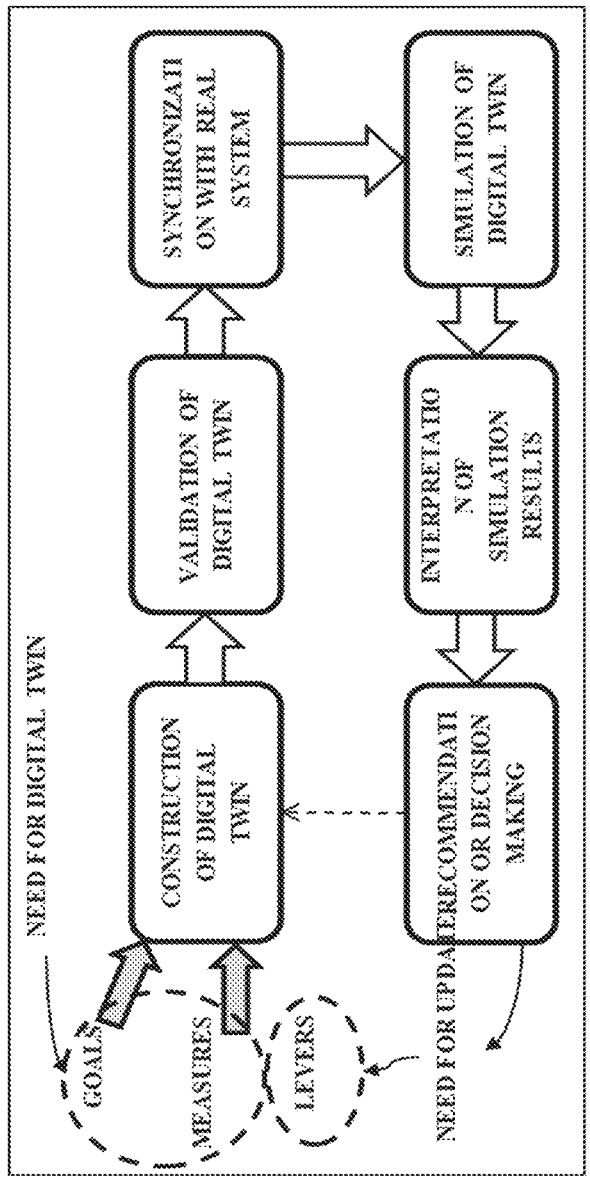
FIG. 2B describes a second block diagram of a method and system for learning based modelling of a complex system in accordance with example embodiments of the present disclosure.
Figure 2C:
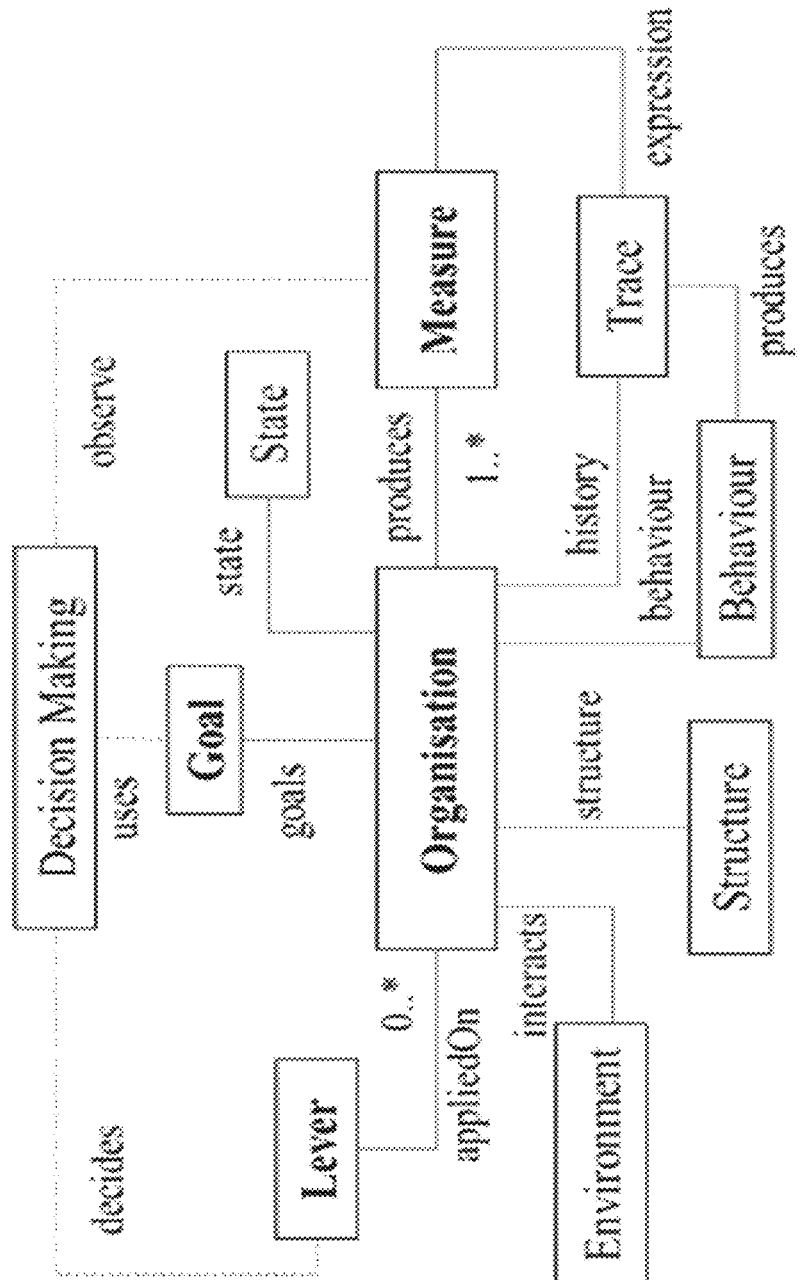
FIG. 2C describes a third block diagram of a method and system for learning based modelling of a complex system in accordance with example embodiments of the present disclosure.
Figure 2D:
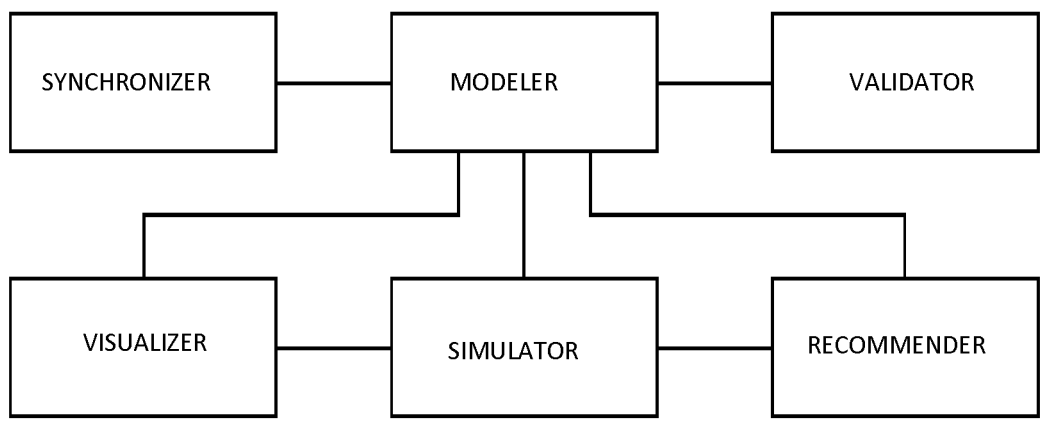
FIG. 2D describes a fourth block diagram of a method and system for learning based modelling of a complex system in accordance with example embodiments of the present disclosure.
Figure 2E:
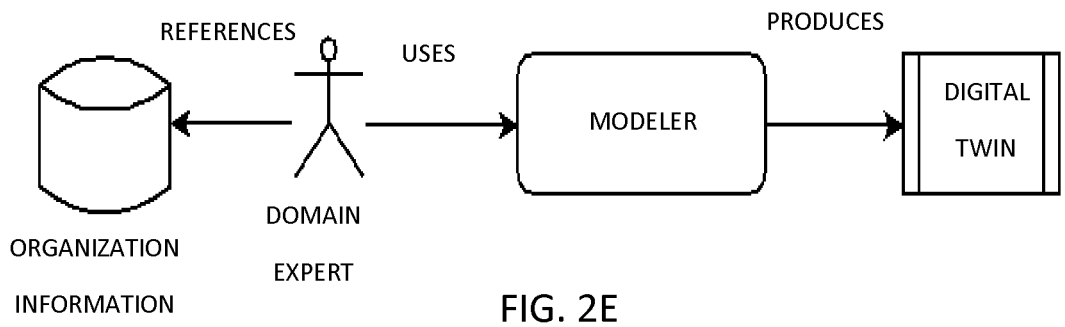
FIG. 2E describes a fifth block diagram of a method and system for learning based modelling of a complex system in accordance with example embodiments of the present disclosure.
Figure 2F:
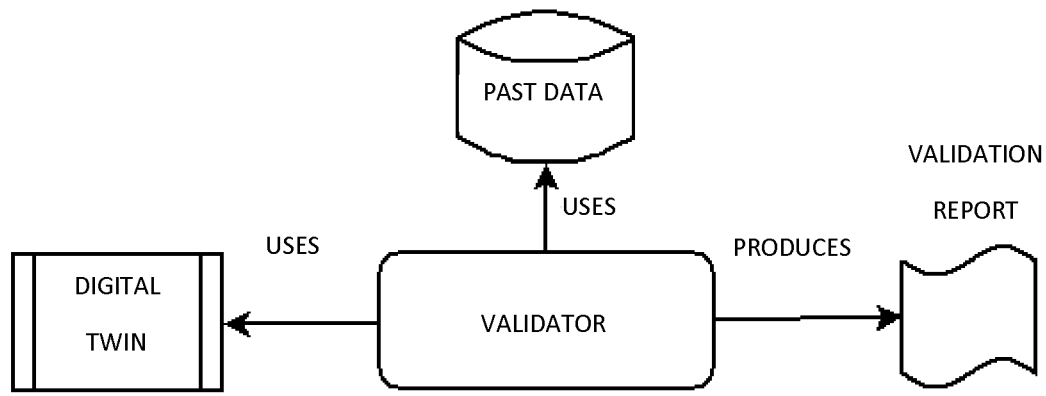
FIG. 2F describes a sixth block diagram of a method and system for learning based modelling of a complex system in accordance with example embodiments of the present disclosure.
Figure 2G:
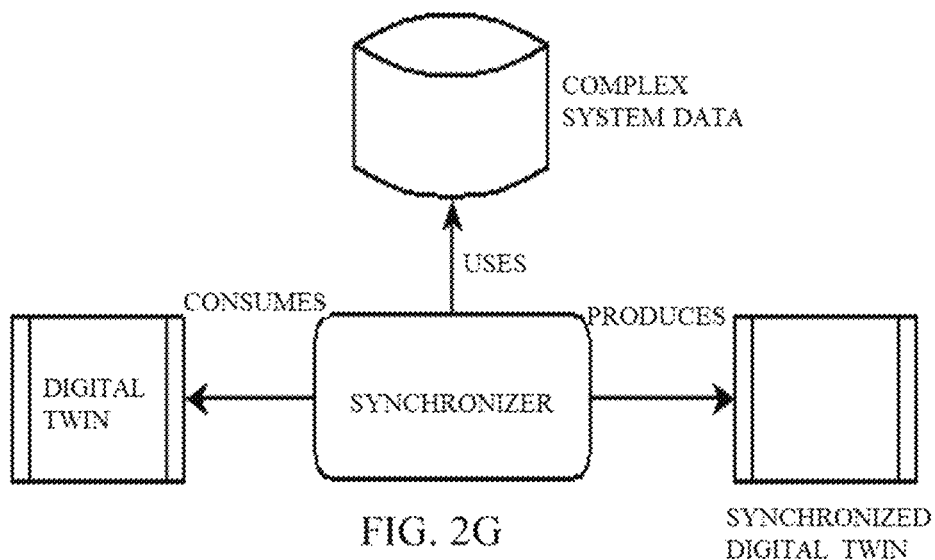
FIG. 2G describes a seventh block diagram of a method and system for learning based modelling of a complex system in accordance with example embodiments of the present disclosure.
Figure 2H:
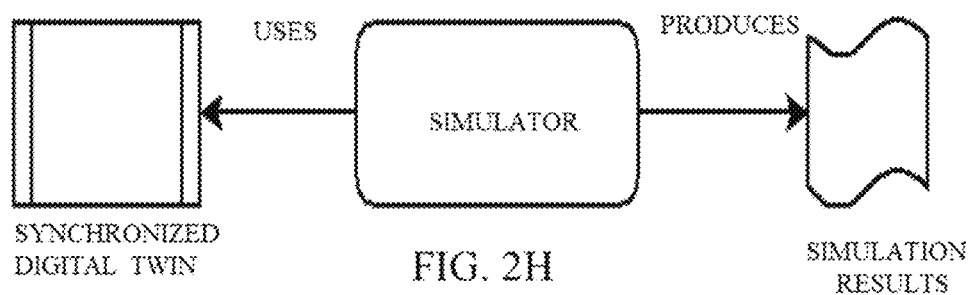
FIG. 2H describes an eight block diagram of a method and system for learning based modelling of a complex system in accordance with example embodiments of the present disclosure.
Figure 2I:
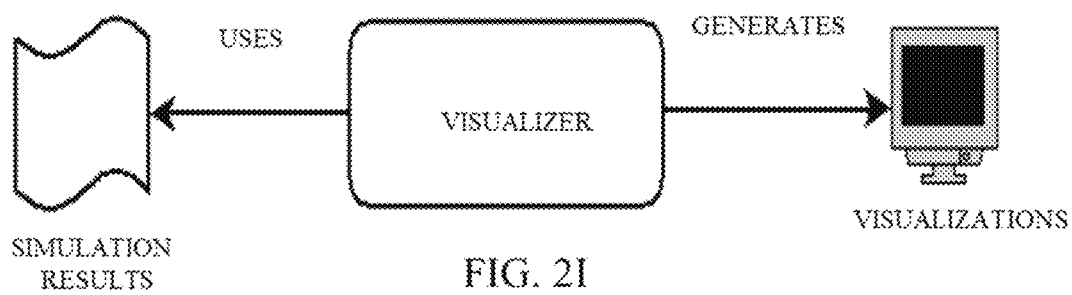
FIG. 2I describes a ninth block diagram of a method and system for learning based modelling of a complex system in accordance with example embodiments of the present disclosure.
Figure 2J:
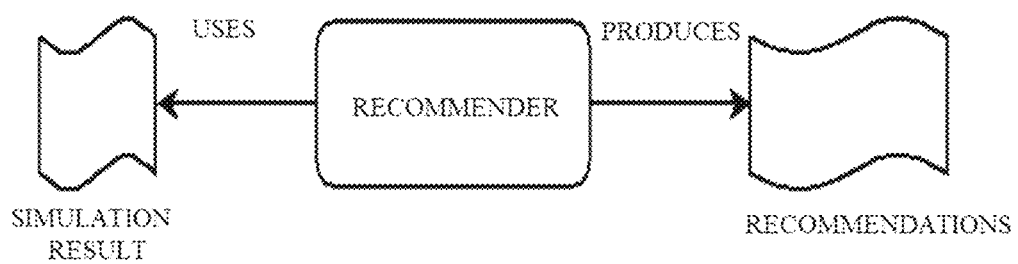
FIG. 2J describes a tenth block diagram of a method and system for learning based modelling of a complex system in accordance with example embodiments of the present disclosure.
Figure 3:
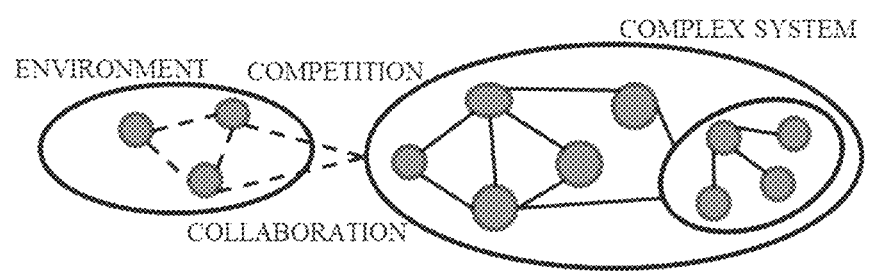
FIG. 3 illustrates an environment and complex system topology for learning based modelling of a complex system in accordance with example embodiments of the present disclosure.
Figure 4:
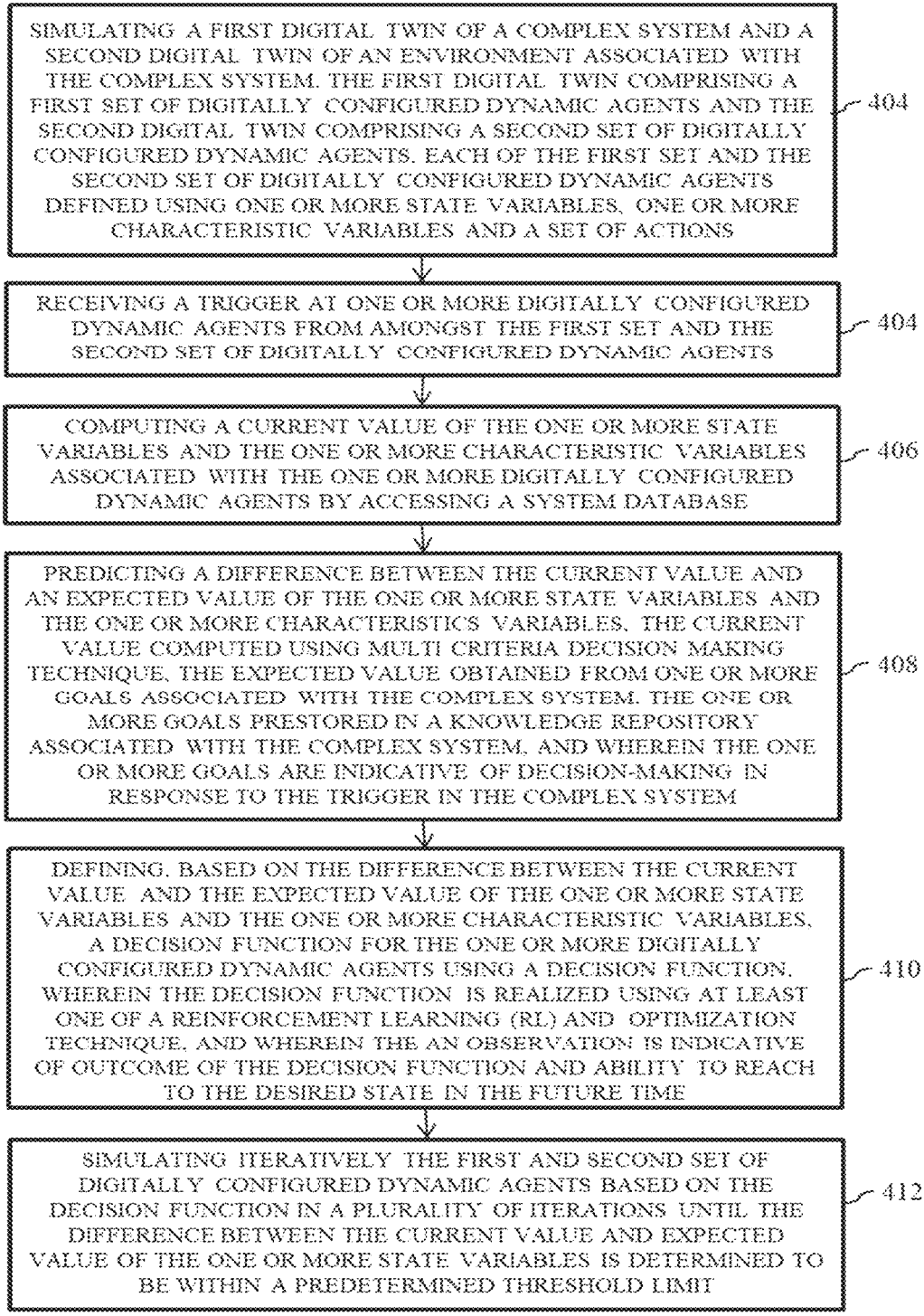
FIG. 4 illustrates a flow chart of a method for learning based modelling of a complex system in accordance with example embodiments of the present disclosure.
Figure 5:
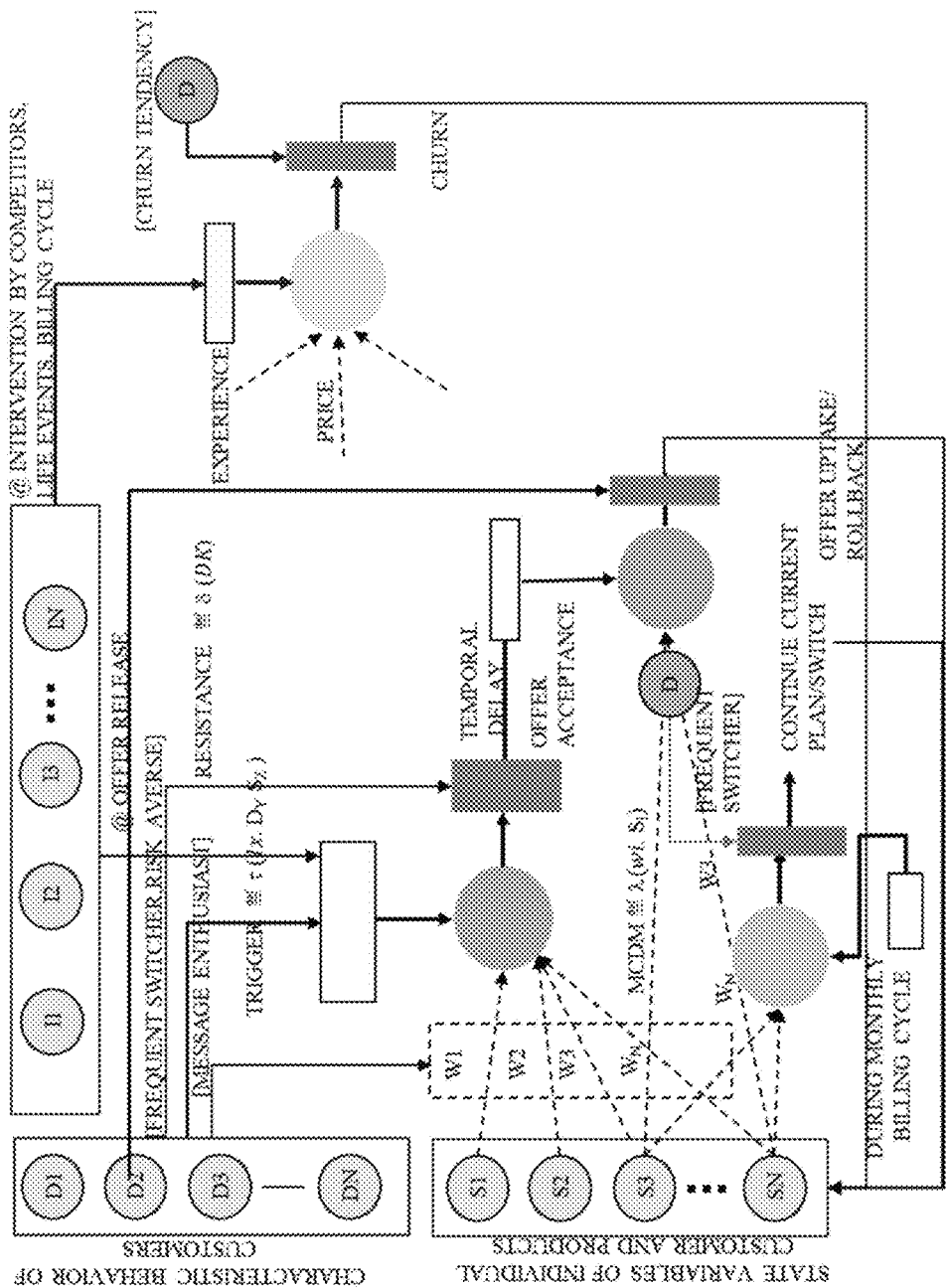
FIG. 5 illustrates structure of a digitally configured dynamic agent in accordance with an example embodiment.
Figure 6:
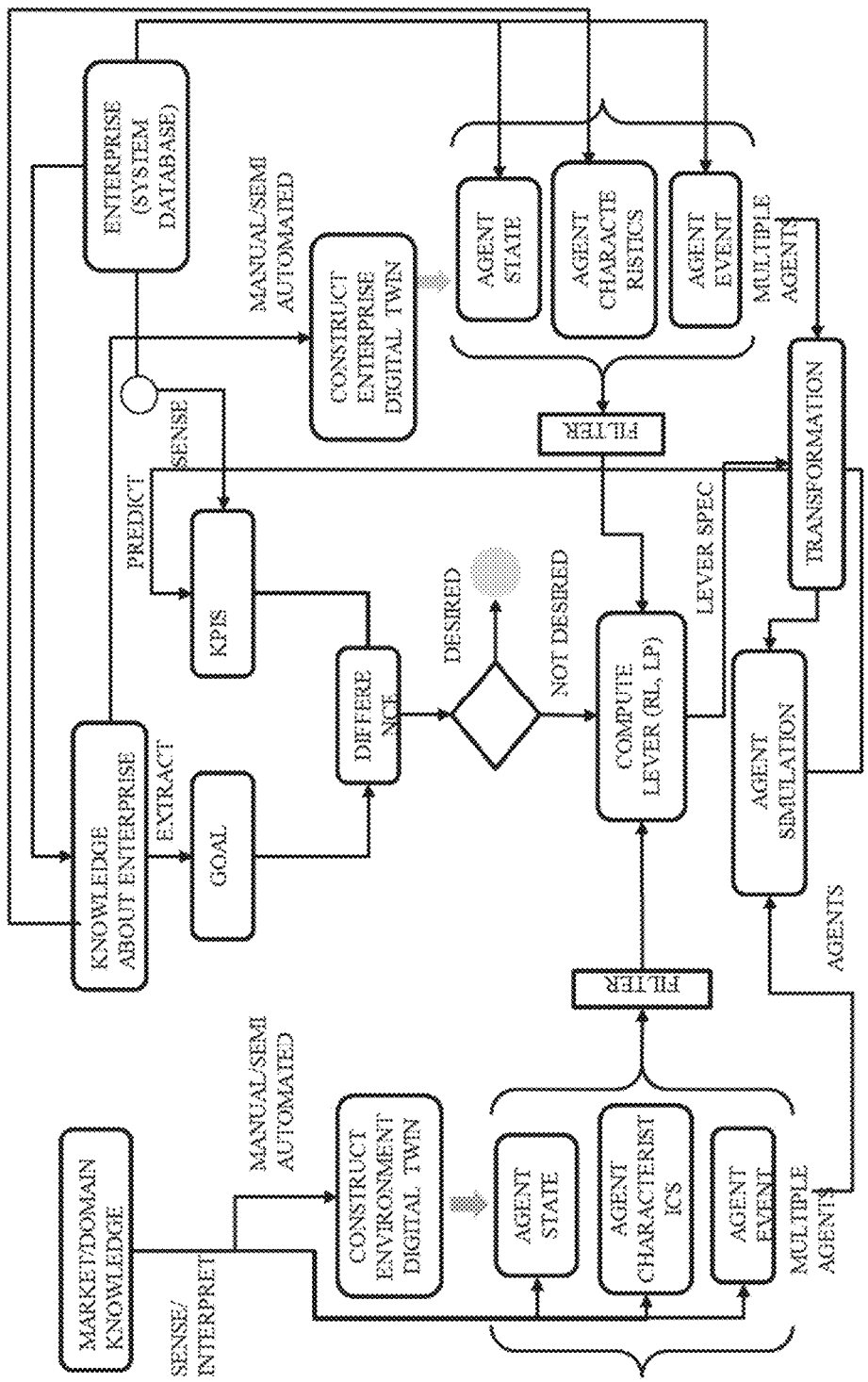
FIG. 6 illustrates a flow diagram of the method for learning based modelling of a complex system in accordance with example embodiments of the present disclosure.

Referring collectively to FIGS. 2A-6, a method for learning based modelling of a complex system in accordance with example embodiments of the present disclosure. For example, FIGS. 2A-2F discloses method and system for learning based modelling of a complex system in accordance with example embodiments of the present disclosure. FIG. 3 illustrates a flow chart of a method for learning based modelling of a complex system in accordance with example embodiments of the present disclosure. FIG. 4 illustrates an environment and complex system topology for learning based modelling of a complex system in accordance with example embodiments of the present disclosure. FIG. 5 illustrates structure of a digitally configured dynamic agent in accordance with an example embodiment. FIG. 6 illustrates a flow diagram of the method for learning based modelling of a complex system in accordance with example embodiments of the present disclosure.

Herein, for the purpose of explanation, an enterprise (or an organization) is taken as an example of the complex system, however, it will be understood that the any complex system which includes a systems and subsystems may be defined as a complex system, such as a city, a state, a country, an educational institute, a training institute, an e-commerce system, and so on and so forth.

FIG. 2A illustrates a digital twin for decision making in accordance with an example embodiment. FIG. 2B represents steps in the decision-making process using a digital twin in accordance with an example embodiment. As is seen with reference to FIGS. 2A-2B, once the need for the digital twin and the corresponding goals and measures are identified for a decision-making problem, the digital twin is constructed. The digital twin represents the structure and behavior of the enterprise and it is constructed using actor model of computation. The construction process involves identification of the relevant information from various information sources from the enterprise. Some of the sources are organizational objectives, vision, reports, structure, processes, and existing IT systems, among others. The construction process is semi-automatic and involves subject matter experts or domain experts.

An actor meta-model used to construct a digital twin of the complex system for simulation is already described with reference to FIG. 1. FIG. 2C illustrates an example typical representation of the organization's (or complex system's) meta-model for decision making. The organization meta model highlights goal, measure and lever entities and their relations to relevant entities for organizational decision making. A block diagram broadly describing the decision-making steps at a system for the complex system using the digital twin is shown in FIG. 2D.

As illustrated in FIG. 2D, the block diagram of a system for decision making of the complex system includes a modeler component, a validator component, a synchronizer component, a simulator component, a visualizer component, and a recommender component. The aforementioned components of the system are described further in detail below with reference to FIGS. 2E-2I.

Referring collectively to FIGS. 2E-2I, once the digital twin is constructed, the validation process is carried out to ensure faithful representation of the real enterprise (or the complex system). Various techniques from operational validation may be employed. Historical data from different information technology (IT) systems of the complex system may be utilized and the digital twin is subjected to past events (obtained from the historical data) to simulate the past behavior. If this simulation leads to observations that tally with real historical observations, the validation process is successful. Otherwise, the construction process is revisited, gaps between the real system and the digital twin are identified, and the digital twin is suitably modified. The modified twin is again subjected to validation.

As illustrated in FIG. 2A, the digital twin (for example, the first digital twin and the second digital twin) for learning based modeling of emergent behavior of complex systems may be constructed as a faithful representation of the real system and instantiated with real data from the complex system. Decision making experiments and explorations may be carried out on the digital twin using the bottom-up simulation techniques, and the generated data or observations from the digital twin enables selection of optimal choices for decision making.

Next, the digital twin is initialized or instantiated with data from various information sources from the enterprise. The primary sources of the data used for synchronization comes from existing IT systems of the enterprise. Extract-Transform-Load (ETL) process may be employed for this purpose. Some of the information required for initialization of the digital twin may not be available in existing systems directly. Various data analytics or machine learning techniques may be employed to compute the missing information. After initialization, the digital twin is ready for simulation.

During simulation (as shown in FIG. 2H), the digital twin may be subjected to all the events that are expected in the real system in certain period. During the simulation process, the state of the digital twin undergoes changes in response to the events. The identified measures are computed. The information generated during simulation is stored for further analysis and interpretation.

The information generated during simulation are analyzed and interpreted by different stakeholders such as domain experts and decision makers. Different stake holders require different views on the information and the information is presented through various visualization aids (as illustrated in FIG. 2I). For example, domain experts may be interested in changes in customer base while decision makers may be interested in overall revenue or profit.

The final step in the overall process is recommendation or actual decision making which is based on outcome of the digital twin. If the computed measures for the identified goals are acceptable to all the stakeholders, levers (if any) are deemed appropriate and the suitable recommendation are suggested for the real system. Otherwise, different what-if scenarios are tried out by adopting or adjusting various levers and their outcomes are evaluated. Various decision-making techniques are adopted to optimize the levers to achieve the goals as indicated by the measures. Some of the techniques adopted are reinforcement learning, genetic algorithm, linear programming, etc.

The very first simulation of the digital twin is performed without adopting any levers to measure the as-is state of the enterprise. If the measures indicate the goals are achieved without introducing any levers, the current state of the real enterprise (people, processes, and systems) are deemed appropriate and no modification or changes are recommended. On the contrary, the measures may indicate the goals are not achieved with as-is system. This indicates there is a need for update and various if-what scenarios are simulated by adopting various levers. Multiple iterations through all the steps may be required to achieve the stated goals. Decision enablers such as reinforcement learning (RL) or genetic algorithm (GA) helps in reducing the number of iterations.

Aforementioned FIGS. 2E-2I described system components for simulating a digital twin. In accordance with various embodiments, the complex system (e.g. an enterprise) and environment of the complex system configures a topology as set of interacting agents as shown in FIG. 3. The complex system may be associated with certain traits, including, for example, it's a system of systems. The complex system may include multiple units which may be intentional, autonomous, reactive and probabilistic. The units may exhibit spatio-temporal characteristics and non-linear interactions, in light of which, the overall behavior of the complex system may emerge with time as described above. The disclosed system is capable of observing the set of actions of the complex system and its environment to capture emergent behavior of the complex system.

As previously described, the emergent behavior of the complex system can be modeled by using a digital twin which further may be utilized for predictions in decision-making process. A first digital twin of the complex system and a second digital twin of the environment associated with the complex system are simulated at 402. In an embodiment, the first digital twin and the second digital twin may be simulated as described with reference to FIGS. 2D-2I.

The first digital twin includes a first set of digitally configured dynamic agents and the second digital twin includes a second set of digitally configured dynamic agents. The first set and the second set of digitally configured dynamic agents may hereinafter be collectively referred to as agents. The agents are capable of learning over a period of time by observing the changes (or the set of actions) in the complex system and the environment. In this context, the characteristics of an agent change over time by observing some or many (or a pattern of) actions resulting into good and/or bad state over the time. For both the scenarios, the agents may change characteristics thereof based on observation (of actions and results of actions), and hence, the agents are termed as digitally configured dynamic agents. The structure of an agent is described with reference to FIG. 5.

Referring to FIG. 5, a schematic representation of a digitally configured dynamic agent, for example, each agent of the first set and the second set of the digitally configured dynamic agents is presented in accordance with an example embodiment. As illustrated, each agent is formed using a tuple: <Goal, state variables, characteristics variables, a set of Actions>, where an action is defined as tuple <Event, Trigger, Computation, Resistance>. Each of the first set and the second set of the digitally configured dynamic agents may be defined using one or more state variables, one or more characteristic variables and a set of actions.

For the ease of understanding, the disclosed embodiments are explained by taking a simple example of a telecom customer as the agent (refer to FIG. 5). The customer may assume various states that may be represented by way of state variables. For example, in the present scenario, if the telecom customer has not paid last month's bill, then the customer may assume the state as 'defaulter'. The one of more characteristic variables determine the characteristics and/or behavioral pattern or behavioral traits of an customer (or the agent). For example, characteristics of a telecon customer may be—(a) 'delayed payer'—pay bill with fine after specified last date, (b) 'frequent caller'—call customer care for every small network issues).

In an example scenario, the customer may wish to take a phone plan and may have two options, namely Plan A and Plan B. Plan A may be [price 399, 100 calls/day and 1 GB data/day] and Plan B may be [price 499, 50 calls/day and 4 GB data/day). The telecom customer may select a plan based on the need (i.e., State represented as state variable) and characteristics (represented as characteristic variables). If the customer is not frequent caller and not a price sensitive person, then the customer may select Plan B otherwise the customer may select Plan A. Herein, it will be noted that the aforementioned example is taken for the ease of understanding of the embodiments and to illustrate the meanings of terms, however, in case of complicated examples (offering huge number of options and attributes) the selection process may become complicated.

In an embodiment, the one or more state variables describe the current state of an agent (e.g. $S_1$, $S_2$, $S_n$, illustrated in FIG. 5). The one or more characteristic variables determine the characteristics or behavioral pattern or behavioral traits of the agent ($D_1$, $D_2$, ... $D_n$ in FIG. 5).

An event is a meaningful phenomenon where a phenomenon is commutated using pattern matching on predefined activities occurring within agent, enterprise (i.e. the complex system) and/or environment. The event may be a specific happening outside of an agent. For example, in the aforementioned example, an event for a customer (or agent) may be—a) receiving an short messaging service (SMS) stating telecom company agent have introduced a new product or offering, b) receiving a bill, c) receiving a news that all other customers are happy/unhappy about certain product, and so on and so forth.

A trigger is true iff (Event) occurs and (Expression on (Characteristics Variables)==True)

Computation refers to a ComputationFunction (State Variables, Characteristics Variables), where multicriteria decision-making (MCDC) is used as an option for ComputationFunction.

Resistance value function refers to a threshold of an agent to take a specific action. For example, a customer (i.e. agent in this case) might know that a product is better suited for his/her needs but may not be significant value-add to switch to said product. This function depends on the characteristic variables (for example, customer profile including behavioral traits) of the customer. Herein the 'swithing to a different product' is the 'event'.

Resistance: ComputedValue−Threshold, where Threshold is a function over Characteristics Variables.

It will be noted that an action can be triggered by an agent when outcome of computation function is greater than the threshold value (or resistance value), which is a function of characteristic variables. Each agent may have different threshold to act/trigger an action.

At 404, the method 400 includes receiving a trigger event at one or more digitally configured dynamic agents from amongst the first set and the second set of digitally configured dynamic agents.

At 406, the method 400 includes computing a current value of the one or more state variables and the one or more characteristic variables associated with the one or more digitally configured dynamic agents by accessing a system database. In an embodiment, the current value of the state variables and the characteristic variables are obtained using computed using multi criteria decision making (MCDM) technique. MCDM ranks a set of options from the attributes of the options and corresponding affinities of the attributes. For instance, in the aforementioned example, phone plans (Plan A and Plan B) may be the set of options available, and the need of the customer may define the state variables, and the behavior or nature of the customer may define characteristics variables.

At 408, the method 400 includes predicting a difference between the current value and an expected value of the one or more state variables and the one or more characteristics variables.

Difference=KPIs (current values of the state variables)−Goal (expected values of the state variables).

The expected value of the state variables may be obtained from one or more goals associated with the complex system. The one or more goals may be prestored in a knowledge repository associated with the complex system. For example, in case of an enterprise, the knowledge repository may be a system database associated with the enterprise. The one or more goals are indicative of decision-making in response to the trigger in the complex system.

Observation=polarity of the 'Difference' (i.e., if Difference>=0 then it is positive observation else negative observation)

At 410, the method 400 includes defining, based on a difference between the current value and the expected value of the one or more state variables and the one or more characteristic variables, a decision function for the one or more digitally configured dynamic agents using decision function. In an embodiment, the decision function may be realized using Reinforcement learning (RL) and/or optimization technique. In an embodiment, each agent may include a reinforcement learning agent that is capable of observing actions taken by the decision function and consequence of the action (i.e., said action is helping to reach desired state variable values) during the iterative simulations (i.e., predicting if agent is reaching its goal in the future or not). Herein, an observation is indicative of outcome of the decision function and ability to reach to a desired state in a future time. For example in the aforementioned example, if an agent observes (as defined using term 'observation') its selection of a Plan (e.g., Plan A or Plan B) resulting into unsatisfactory results (i.e. negative observation) for a predefined number of observations, then the agent may change characteristics variables (e.g., price sensitive to non-price sensitive) thereof using a learning technique (for example reinforcement learning) so as to get positive observations. This type of self-adaptation may be triggered after a specific learning over multiple observations (i.e. experience).

At 412, the method 400 includes simulating iteratively the first and second set of digitally configured dynamic agents based on the decision function in a plurality of iterations until the difference between the current value and expected value of the one or more state variables is determined to be within a predetermined threshold limit.

In an embodiment, the actions taken by each agent over a predefined period of time may lead to learning of that agent. For example, based on a series of actions taken by the digitally configured dynamic agent over a predefined period of time and observing values in terms of the one or more state variables in cognizance of the one or more goals of the digitally configured dynamic agent and actual state variable after the predefined period of time, the system may trigger a modification in the one or more characteristics variables of the agent. For example, for (all desired state variable)

Value$_{state\_variable}$=desired state variable−actual state variable

Overall Value=Function (All Value$_{state\_variables}$), where Function can be specified using MCDM technique as some Value$_{state\_variable}$ may be positive and other may be negative with different magnitude.

If (Overall Value>0 or a threshold value) then combination of characteristics variables is assumed to help the agent in a positive direction so no change in characteristic variable is required but if the overall value is below the threshold, then the agent can adapt to achieve the goal by changing characteristic variables. In an embodiment, RL is used to decide the characteristic variables that should be changed and the change to be introduced in such characteristic variables of the agent.

Figure 7:
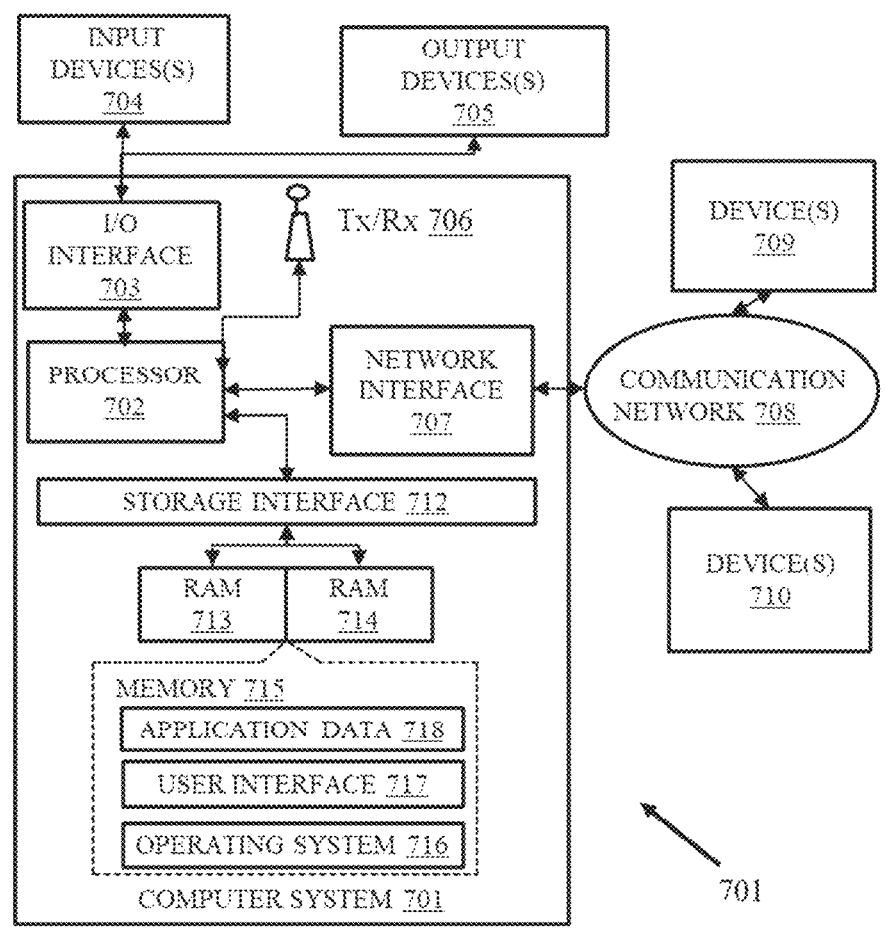
FIG. 7 is a block diagram of an exemplary computer system for implementing embodiments consistent with the present disclosure

FIG. 7 is a block diagram of an exemplary computer system 701 for implementing embodiments consistent with the present disclosure. Variations of computer system 701 may be used for implementing the devices included in this disclosure. Computer system 701 may comprise a central processing unit ("CPU" or "hardware processor") 702. The hardware processor 702 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™ ARM's application, embedded or secure processors, IBM PowerPC™, Intel's Core, Itanium™, Xeon™, Celeron™ or other line of processors, etc. The processor 702 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709 and 710. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 613, ROM 614, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 716, user interface application 717, user/application data 718 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 701 may store user/application data 618, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides a learning-based modelling of an emergent behavior of a complex system. The disclosed system includes a digital twin of the complex system and a digital twin of an environment of said complex system, and captures an interaction and dynamic behavior of agents of the digital twins. The agents of the digital twins are modelled using learning-based models such as RL and genetic algorithms that learns the behavior (i.e. actions and their outcomes) over a period of time. Hence, the agents (or actors) of the digital twins are dynamic in nature. The actor-based bottom up simulation approach is capable of producing sufficient insight for effective decision making prior to implementation.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
    simulating, via one or more hardware processors, a first digital twin of a complex system and a second digital twin of an environment associated with the complex system, the first digital twin comprising a first set of digitally configured dynamic agents and the second digital twin comprising a second set of digitally configured dynamic agents, wherein the first digital twin and the second digital twin are digital replica of the complex system and the environment associated with the complex system, wherein each of the first set and the second set of digitally configured dynamic agents defined using one or more state variables, one or more characteristic variables and a set of actions, wherein the first set of digitally configured dynamic agents and the second set of digitally configured dynamic agents are capable of learning over a period of time by observing the set of actions in the complex system and the environment respectively, wherein the first digital twin and the second digital twin are constructed by identifying information from plurality of sources of information of the complex system, wherein the first digital twin and second digital twin are validated by subjecting the first digital twin and second digital twin to past events to simulate past behavior, wherein one or more characteristics of the first set and the second set of digitally configured dynamic agents change over a time by observing the set of actions resulting into good or bad state over the time, wherein the complex system comprises a system of systems, and the complex system is a reactive entity and exchanges messages and resources with the environment associated with the complex system, the complex system composes a number of interdependent subsystems or elements in a nonlinear way, wherein the digital twins capture and represents structure as well as behavior of the complex system and the environment, and the digital twins capture an interaction and dynamic behavior of the digitally configured dynamic agents;
    receiving, via the one or more hardware processors, a trigger at one or more digitally configured dynamic agents from amongst the first set of digitally configured dynamic agents and the second set of digitally configured dynamic agents;
    computing, via the one or more hardware processors, a current value of the one or more state variables and the one or more characteristic variables associated with the one or more digitally configured dynamic agents by accessing a system database;
    predicting, via the one or more hardware processors, a difference between the current value and an expected value of the one or more state variables and the one or more characteristics variables, the current value computed using a multi criteria decision making technique, the expected value obtained from one or more goals associated with the complex system, the one or more goals prestored in a knowledge repository associated with the complex system, and wherein the one or more goals are indicative of decision-making in response to the trigger in the complex system;
    defining, based on the difference between the current value and the expected value of the one or more state variables and the one or more characteristic variables, a decision function for the one or more digitally configured dynamic agents using the decision function, via the one or more hardware processors, wherein the decision function is realized using at least one of a Reinforcement learning (RL) and optimization technique, and wherein an observation is indicative of outcome of the decision function and ability to reach to a desired state in a future time, wherein RL decides the characteristic variables which should be changed and the change to be introduced in the characteristic variables of the agent;

simulating iteratively, via the one or more hardware processors, the first and the second set of digitally configured dynamic agents based on the decision function in a plurality of iterations until the difference between the current value and the expected value of the one or more state variables is determined to be within a predetermined threshold limit, wherein each of the first set and the second set of digitally configured dynamic agents comprises an RL agent capable of observing action taken by the decision function and consequence of the action during the iterative simulations; and triggering a modification in the one or more characteristics variables of a digitally configured dynamic agent from amongst the one or more digitally configured dynamic agents based on a series of actions taken by the digitally configured dynamic agent over a predefined period of time and observing values in terms of the one or more state variables in cognizance of the one or more goals of the digitally configured dynamic agent and actual state variable after the predefined period of time, wherein the actions taken by each of the digitally configured dynamic agent over the predefined period of time leads to learning of that dynamic agent, wherein an action from amongst the set of actions is defined using a tuple comprising an event, the trigger, a computation function, and a resistance value, and wherein the computation function is a function of the one or more state variables and the one or more characteristics variables, wherein the RL is used to decide the characteristic variables to be changed and the change to be introduced in the characteristic variables of the agent, wherein the action is triggered by the agent when outcome of computation function is greater than the threshold value, which is a function of characteristic variables, wherein each of the digitally configured dynamic agent have different threshold to trigger the action, and wherein the computation function is calculated using Multicriteria decision-making (MCDM) technique, wherein the resistance comprises a threshold, wherein the threshold is a function over the one or more characteristics variables, and enabling decision makers in evaluating different decision alternatives on the digital twin of the complex system and enabling to identify optimal choices to be applied on the complex system in an automated manner.

2. A system comprising:

a memory storing instructions;

one or more communication interfaces; and one or more hardware processors coupled to the memory via the one or more communication interfaces, wherein the one or more hardware processors are configured by the instructions to:

simulate a first digital twin of a complex system and a second digital twin of an environment associated with the complex system, the first digital twin comprising a first set of digitally configured dynamic agents and the second digital twin comprising a second set of digitally configured dynamic agents, wherein the first digital twin and the second digital twin are digital replica of the complex system and the environment associated with the complex system, each of the first set and the second set of digitally configured dynamic agents defined using one or more state variables, one or more characteristic variables and a set of actions, wherein the first set of digitally configured dynamic agents and the second set of digitally configured dynamic agents are capable of learning over a period of time by observing the set of actions in the complex system and the environment respectively, wherein the first digital twin and the second digital twin are constructed by identifying information from plurality of sources of information of the complex system, wherein the first digital twin and second digital twin are validated by subjecting the first digital twin and second digital twin to past events to simulate past behavior, wherein one or more characteristics of the set of digitally configured dynamic agents change over a time by observing the set of actions resulting into good or bad state over the time, wherein the complex system comprises a system of systems, and the complex system is a reactive entity and exchanges messages and resources with the environment associated with the complex system, the complex system composes a number of interdependent subsystems or elements in a nonlinear way, wherein the digital twins capture and represents structure as well as behavior of the complex system and the environment, and the digital twins capture an interaction and dynamic behavior of the digitally configured dynamic agents;

receive a trigger at one or more digitally configured dynamic agents from amongst the first set digitally configured dynamic agents and the second set of digitally configured dynamic agents;

compute a current value of the one or more state variables and the one or more characteristic variables associated with the one or more digitally configured dynamic agents by accessing a system database;

predict a difference between the current value and an expected value of the one or more state variables and the one or more characteristics variables, the current value computed using multi criteria decision making technique, the expected value obtained from one or more goals associated with the complex system, the one or more goals prestored in a knowledge repository associated with the complex system, and wherein the one or more goals are indicative of decision-making in response to the trigger in the complex system;

define, based on the difference between the current value and the expected value of the one or more state variables and the one or more characteristic variables, a decision function for the one or more digitally configured dynamic agents using the decision function, wherein the decision function is realized using at least one of a Reinforcement learning (RL) and optimization technique, and wherein the observation is indicative of outcome of the decision function and ability to reach to a desired state in a future time, wherein RL decides the characteristic variables which should be changed and the change to be introduced in the characteristic variables of the agent; and simulate iteratively the first and the second set of digitally configured dynamic agents based on the decision function in a plurality of iterations until the difference between the current value and the expected value of the one or more state variables is determined to be within a predetermined threshold limit, wherein each of the first set and the second set of digitally configured dynamic agents comprises an RL agent capable of observing action taken by the decision function and consequence of the action during the iterative simulations; and trigger a modification in the one or more characteristics variables of a digitally configured dynamic agent from amongst the one or more digitally configured dynamic agents based on a series of actions taken by the digitally configured dynamic agent over a predefined period of time and observing values in terms of the one or more state variables in cognizance of the one or more goals of the digitally configured dynamic agent and actual state variable after the predefined period of time, wherein the actions taken by each of the digitally configured dynamic agent over the predefined period of time leads to learning of that dynamic agent, wherein an action from amongst the set of actions is defined using a tuple comprising an event, the trigger, a computation function, and a resistance value, and wherein the computation function is a function of the one or more state variables and the one or more characteristics variables, wherein the RL is used to decide the characteristic variables to be changed and the change to be introduced in the characteristic variables of the agent, wherein the action is triggered by the agent when outcome of computation function is greater than the threshold value, which is a function of characteristic variables, wherein each of the digitally configured dynamic agent have different threshold to trigger the action, and wherein the computation function is calculated using Multicriteria decision-making (MCDM) technique, and wherein the resistance comprises a threshold, wherein the threshold is a function over the one or more characteristics variables, and enabling decision makers in evaluating different decision alternatives on the digital twin of the complex system and enabling to identify optimal choices to be applied on the complex system in an automated manner.

3. One or more non-transitory machine readable information storage mediums comprising one or more instructions which when executed by one or more hardware processors cause:

simulating, via one or more hardware processors, a first digital twin of a complex system and a second digital twin of an environment associated with the complex system, the first digital twin comprising a first set of digitally configured dynamic agents and the second digital twin comprising a second set of digitally configured dynamic agents, wherein the first digital twin and the second digital twin are digital replica of the complex system and the environment associated with the complex system, each of the first set and the second set of digitally configured dynamic agents defined using one or more state variables, one or more characteristic variables and a set of actions, wherein the first set of digitally configured dynamic agents and the second set of digitally configured dynamic agents are capable of learning over a period of time by observing the set of actions in the complex system and the environment respectively, wherein the first digital twin and the second digital twin are constructed by identifying information from plurality of sources of information of the complex system, wherein the first digital twin and second digital twin are validated by subjecting the first digital twin and second digital twin to past events to simulate past behavior, wherein one or more characteristics of the first set and the second set of digitally configured dynamic agents change over a time by observing the set of actions resulting into good or bad state over the time, wherein the complex system comprises a system of systems, and the complex system is a reactive entity and exchanges messages and resources with the environment associated with the complex system, the complex system composes a number of interdependent subsystems or elements in a nonlinear way, wherein the digital twins capture and represents structure as well as behavior of the complex system and the environment, and the digital twins capture an interaction and dynamic behavior of the digitally configured dynamic agents;

receiving, via the one or more hardware processors, a trigger at one or more digitally configured dynamic agents from amongst the first set digitally configured dynamic agents and the second set of digitally configured dynamic agents;

computing, via the one or more hardware processors, a current value of the one or more state variables and the one or more characteristic variables associated with the one or more digitally configured dynamic agents by accessing a system database;

predicting, via the one or more hardware processors, a difference between the current value and an expected value of the one or more state variables and the one or more characteristics variables, the current value computed using a multi criteria decision making technique, the expected value obtained from one or more goals associated with the complex system, the one or more goals prestored in a knowledge repository associated with the complex system, and wherein the one or more goals are indicative of decision-making in response to the trigger in the complex system;

defining, based on the difference between the current value and the expected value of the one or more state variables and the one or more characteristic variables, a decision function for the one or more digitally configured dynamic agents using the decision function, via the one or more hardware processors, wherein the decision function is realized using at least one of a Reinforcement learning (RL) and optimization technique, and wherein the observation is indicative of outcome of the decision function and ability to reach to a desired state in a future time, wherein RL decides the characteristic variables which should be changed and the change to be introduced in the characteristic variables of the agent; and simulating iteratively, via the one or more hardware processors, the first and the second set of digitally configured dynamic agents based on the decision function in a plurality of iterations until the difference between the current value and the expected value of the one or more state variables is determined to be within a predetermined threshold limit, wherein each of the first set and the second set of digitally configured dynamic agents comprises an RL agent capable of observing action taken by the decision function and consequence of the action during the iterative simulations; and triggering a modification in the one or more characteristics variables of a digitally configured dynamic agent from amongst the one or more digitally configured dynamic agents based on a series of actions taken by the digitally configured dynamic agent over a predefined period of time and observing values in terms of the one or more state variables in cognizance of the one or more goals of the digitally configured dynamic agent and actual state variable after the predefined period of time, wherein the actions taken by each of the digitally configured dynamic agent over the predefined period of time leads to learning of that dynamic agent, wherein an action from amongst the set of actions is defined using a tuple comprising an event, the trigger, a computation function, and a resistance value, and wherein the computation function is a function of the one or more state variables and the one or more characteristics variables, wherein the RL is used to decide the characteristic variables to be changed and the change to be introduced in the characteristic variables of the agent, wherein the action is triggered by the agent when outcome of computation function is greater than the threshold value, which is a function of characteristic variables, wherein each of the digitally configured dynamic agent have different threshold to trigger the action, and wherein the computation function is calculated using Multicriteria decision-making (MCDM) technique, wherein the resistance comprises a threshold, wherein the threshold is a function over the one or more characteristics variables, and enabling decision makers in evaluating different decision alternatives on the digital twin of the complex system and enabling to identify optimal choices to be applied on the complex system in an automated manner.

* * * * *